US012762688B2

(12) United States Patent
Fukuda et al.

(10) Patent No.: US 12,762,688 B2
(45) Date of Patent: Oct. 13, 2026

(54) IMAGE INSPECTION EQUIPMENT AND IMAGE PROCESSING METHOD

(71) Applicant: Hitachi High-Tech Corporation, Tokyo (JP)

(72) Inventors: Kosuke Fukuda, Tokyo (JP); Masayoshi Ishikawa, Tokyo (JP); Yasuhiro Yoshida, Tokyo (JP); Hiroyuki Shindo, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 282 days.

(21) Appl. No.: 18/721,543

(22) PCT Filed: Dec. 28, 2021

(86) PCT No.: PCT/JP2021/048757

§ 371 (c)(1),
(2) Date: Jun. 18, 2024

(87) PCT Pub. No.: WO2023/127081

PCT Pub. Date: Jul. 6, 2023

(65) Prior Publication Data

US 2025/0061559 A1 Feb. 20, 2025

(51) Int. Cl.
*G06T 7/00* (2017.01)
*G06V 10/75* (2022.01)
*G06V 10/84* (2022.01)

(52) U.S. Cl.
CPC .......... *G06T 7/0006* (2013.01); *G06V 10/751* (2022.01); *G06V 10/84* (2022.01); *G06T 2207/30148* (2013.01)

(58) Field of Classification Search
CPC ......... G06T 7/0006; G06T 2207/30148; G06T 2207/20076; G06T 2207/20081;
(Continued)

(56) References Cited

U.S. PATENT DOCUMENTS 11,961,219 B2 * 4/2024 Brauer ..................... G06N 3/08
2017/0194126 A1 7/2017 Bhaskar et al.
(Continued)

FOREIGN PATENT DOCUMENTS

JP 2019-508678 A 3/2019
JP 2019-129169 A 8/2019
(Continued)

OTHER PUBLICATIONS

International Search Report Issued in PCT Application No. PCT/JP2021/048757 dated Mar. 22, 2022, with English Translation.
(Continued)

*Primary Examiner* — Han Hoang
(74) *Attorney, Agent, or Firm* — Foley & Lardner LLP

(57) ABSTRACT

Provided is an image inspection device which can prevent a degradation in the accuracy of an estimation value of a probability distribution caused by position displacement between design data and a captured image in image processing in which a model that estimates a pixel value probability distribution of a captured image is trained by using design data and the captured image of a sample. The image inspection device inspects a captured image by using design data and the capture image of a sample, the device being characterized by comprising: a training processing unit which trains a probability distribution estimation model that estimates, from the design data, a pixel value probability distribution of the captured image; and an inspection processing unit which inspects a captured image for inspection by using the probability distribution estimation model created in the training processing unit, design data for inspection, and the captured image for inspection, wherein the training processing unit includes: a probability distribution estimation unit which estimates, from sample design data for training, a pixel value probability distribution of a sample
(Continued)

captured image for training; a position displacement amount estimation unit which estimates a position displacement amount between a probability distribution during training estimated by the probability distribution estimation unit, and the captured image for training; a position displacement reflection unit which reflects, to the probability distribution during training, the estimation position displacement amount estimated by the position displacement amount estimation unit; and a model update unit which evaluates the probability distribution estimation model of the probability distribution estimation unit by using the captured image for training and the probability distribution during training to which the position displacement calculated by the position displacement reflection unit has been reflected, and updates parameters of the probability distribution estimation model according to the evaluation values.

10 Claims, 12 Drawing Sheets

(58) Field of Classification Search
CPC ............ G06T 2207/20084; G06T 7/00; G06V 10/751; G06V 10/84; G06V 10/70; G01N 23/2251; G01N 2223/401; G01N 2223/6116; G01N 2223/646
See application file for complete search history.

(56) References Cited

U.S. PATENT DOCUMENTS

| | | | |
|---|---|---|---|
| 2018/0107928 | A1 | 4/2018 | Zhang et al. |
| 2018/0218487 | A1* | 8/2018 | Mitarai .................. G06T 7/001 |
| 2019/0228522 | A1* | 7/2019 | Shinoda ................ G06T 7/0006 |
| 2019/0303717 | A1 | 10/2019 | Bhaskar et al. |
| 2021/0343001 | A1* | 11/2021 | Grama .................. G06N 3/094 |
| 2021/0407093 | A1* | 12/2021 | Ben Baruch ............. G06T 7/11 |
| 2022/0012404 | A1 | 1/2022 | Mori |
| 2022/0318975 | A1 | 10/2022 | Ouchi et al. |
| 2023/0222764 | A1 | 7/2023 | Ouchi et al. |

FOREIGN PATENT DOCUMENTS

| | | | |
|---|---|---|---|
| JP | 2019-537839 | A | 12/2019 |
| JP | 2020-123064 | A | 8/2020 |
| WO | WO-2020/121739 | A1 | 6/2020 |
| WO | WO-2020/250373 | A1 | 12/2020 |
| WO | WO-2021/255819 | A1 | 12/2021 |

OTHER PUBLICATIONS

Office Action issued in Taiwanese Application No. 111147553, dated Aug. 8, 2023, with English Translation.

* cited by examiner

[FIG. 1A]
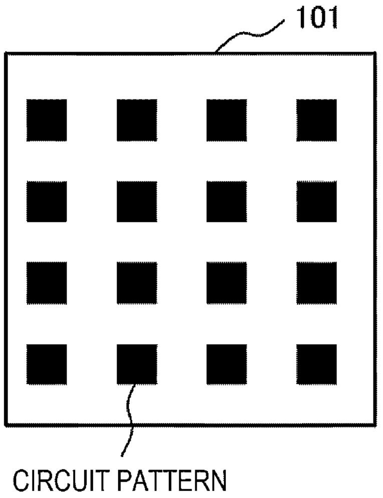
[FIG. 1B]
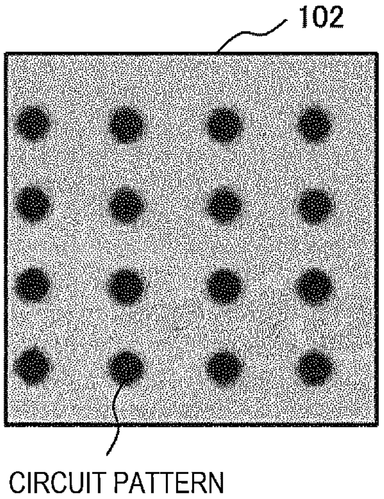

[FIG. 1C]
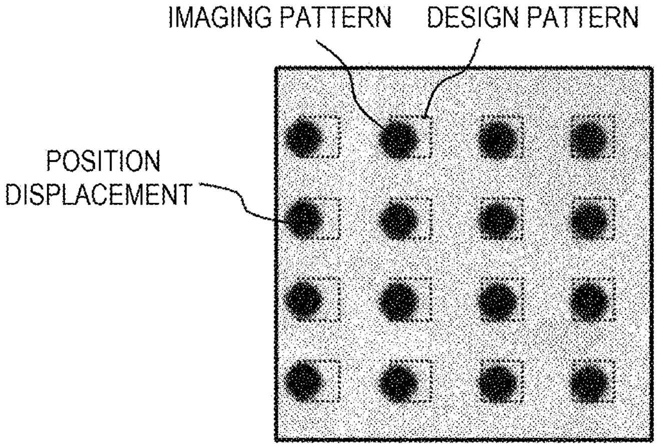
[FIG. 2A]
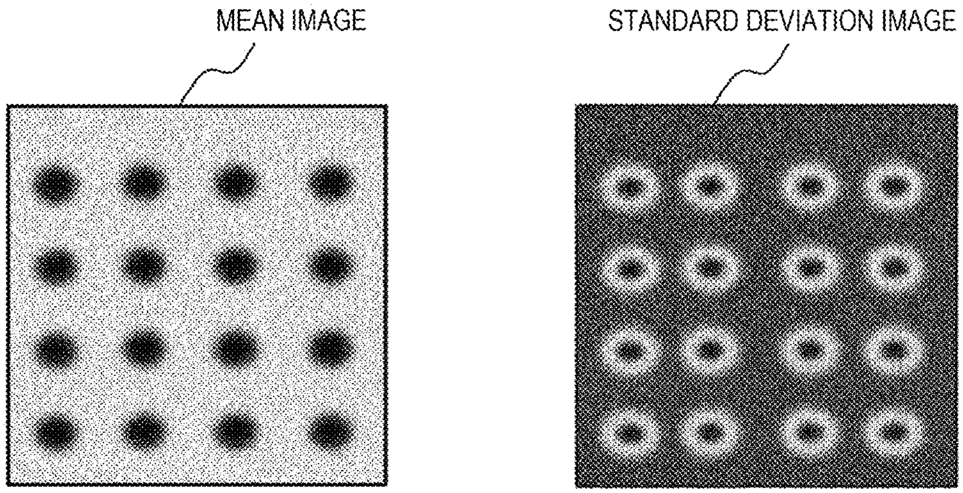

[FIG. 2B]
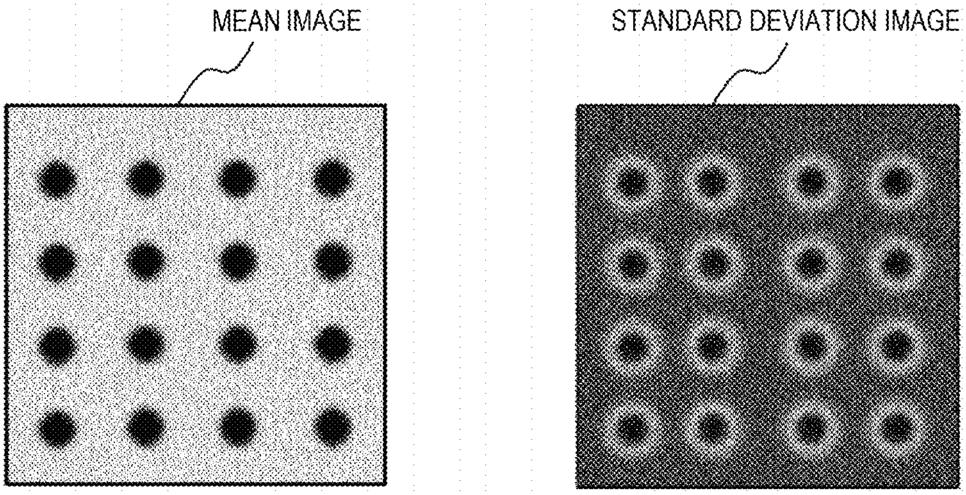
[FIG. 3]
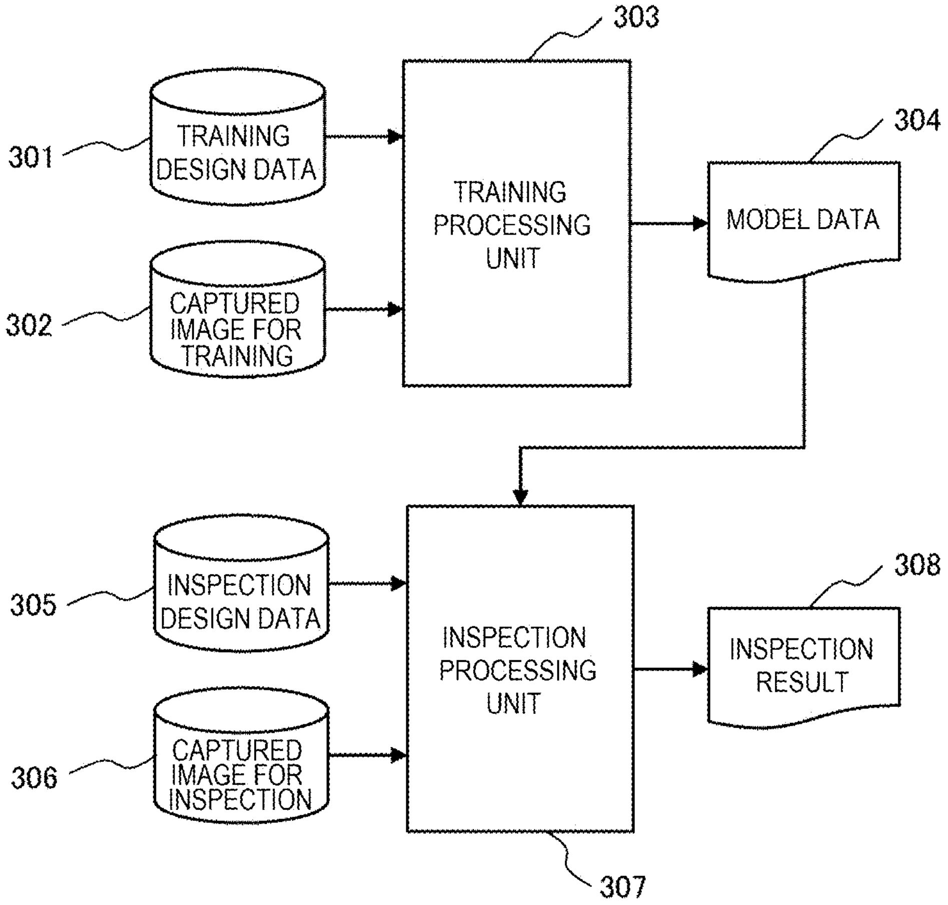

[FIG. 4]
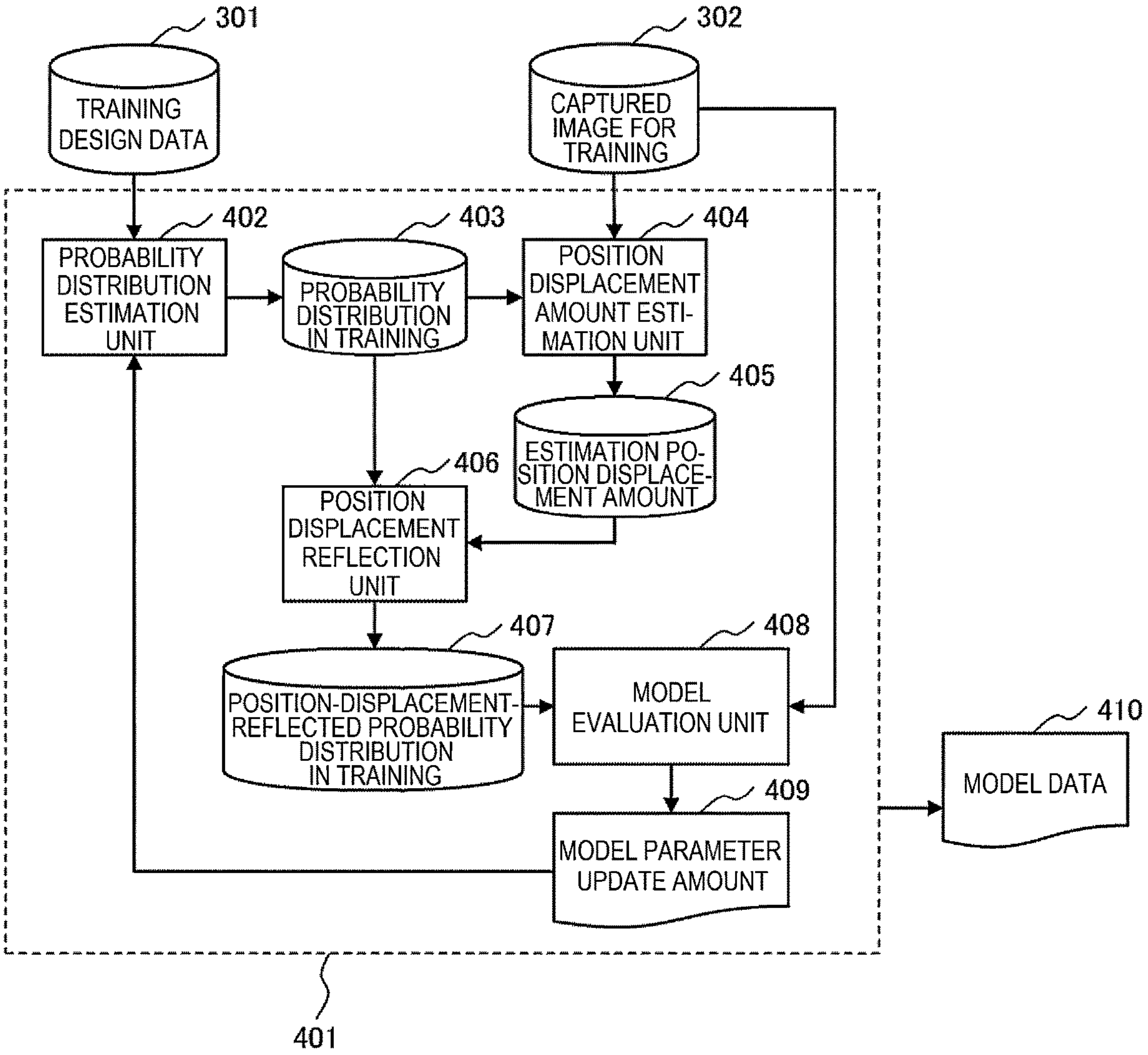

[FIG. 5]
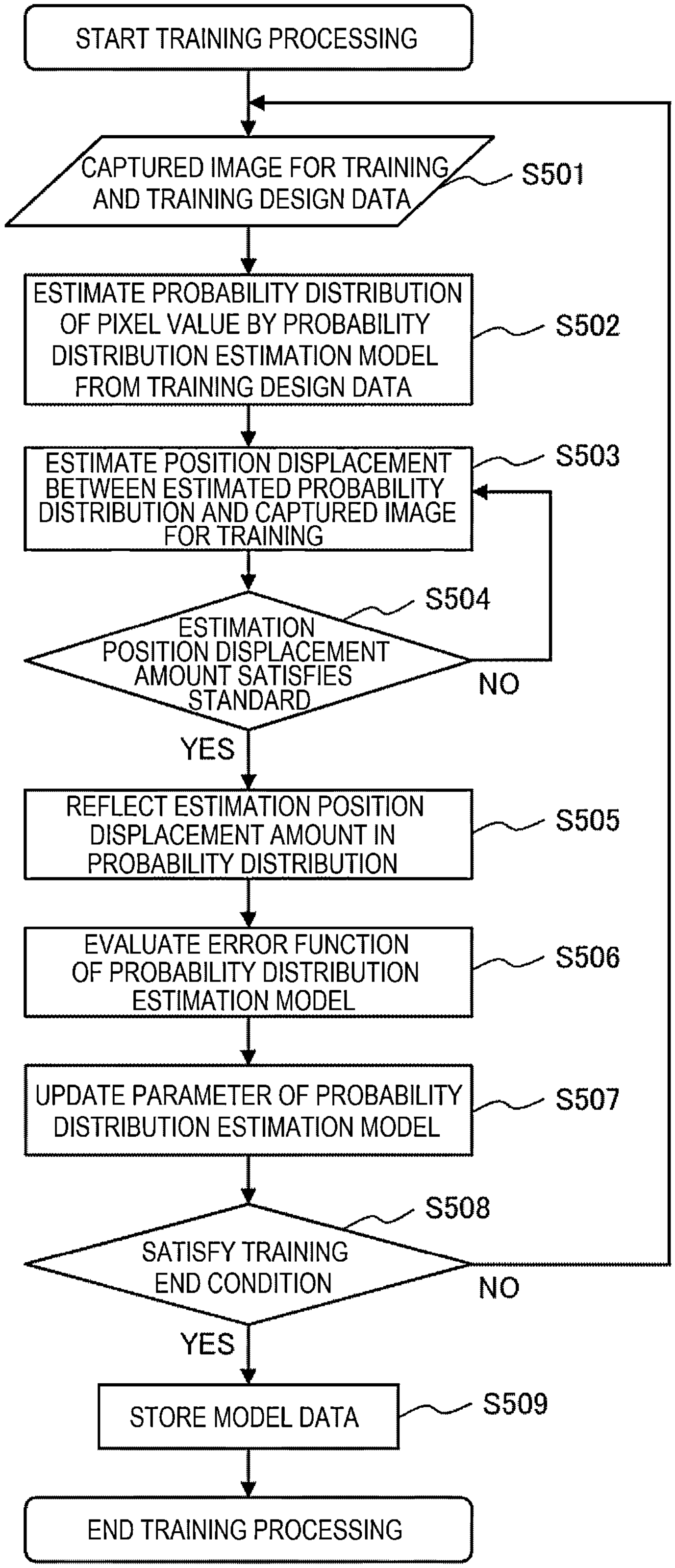

[FIG. 6]
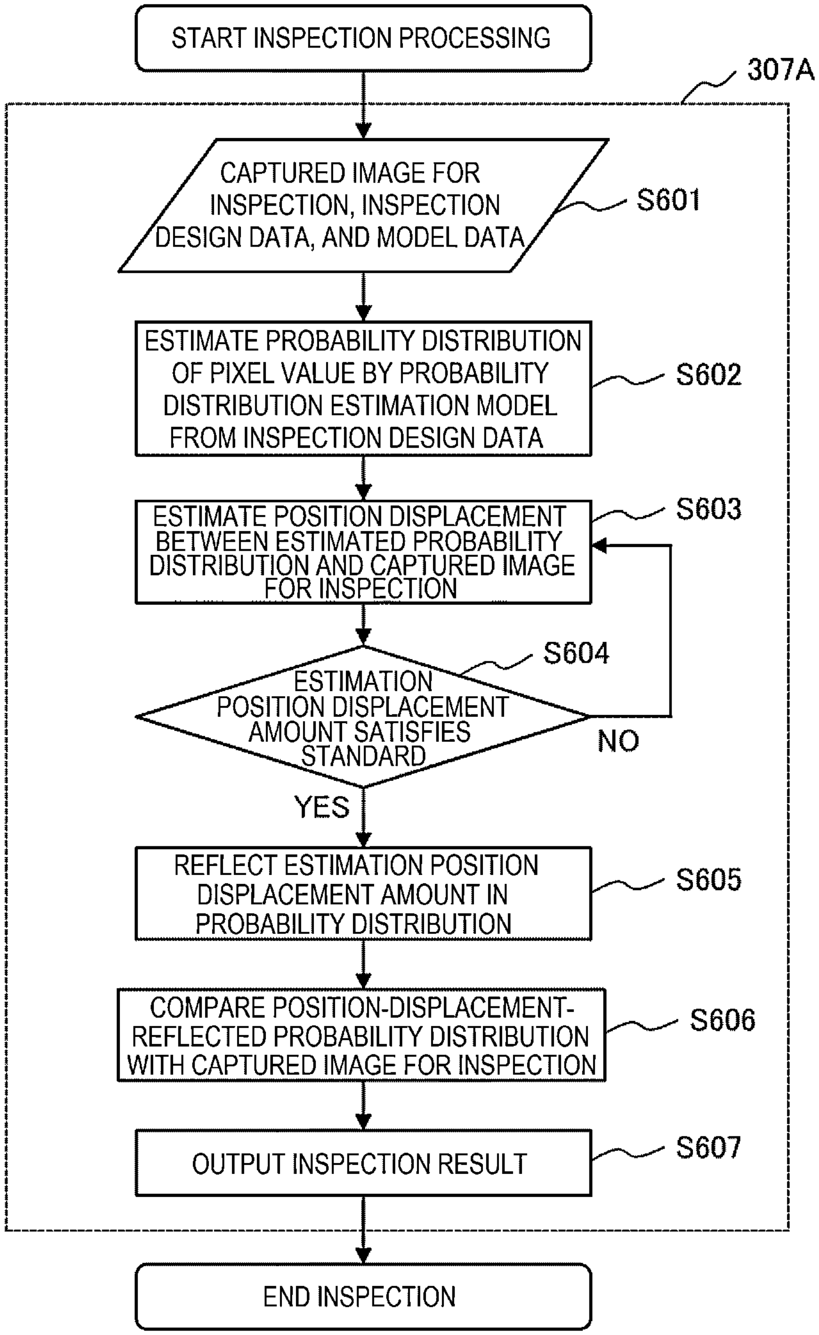

[FIG. 7]
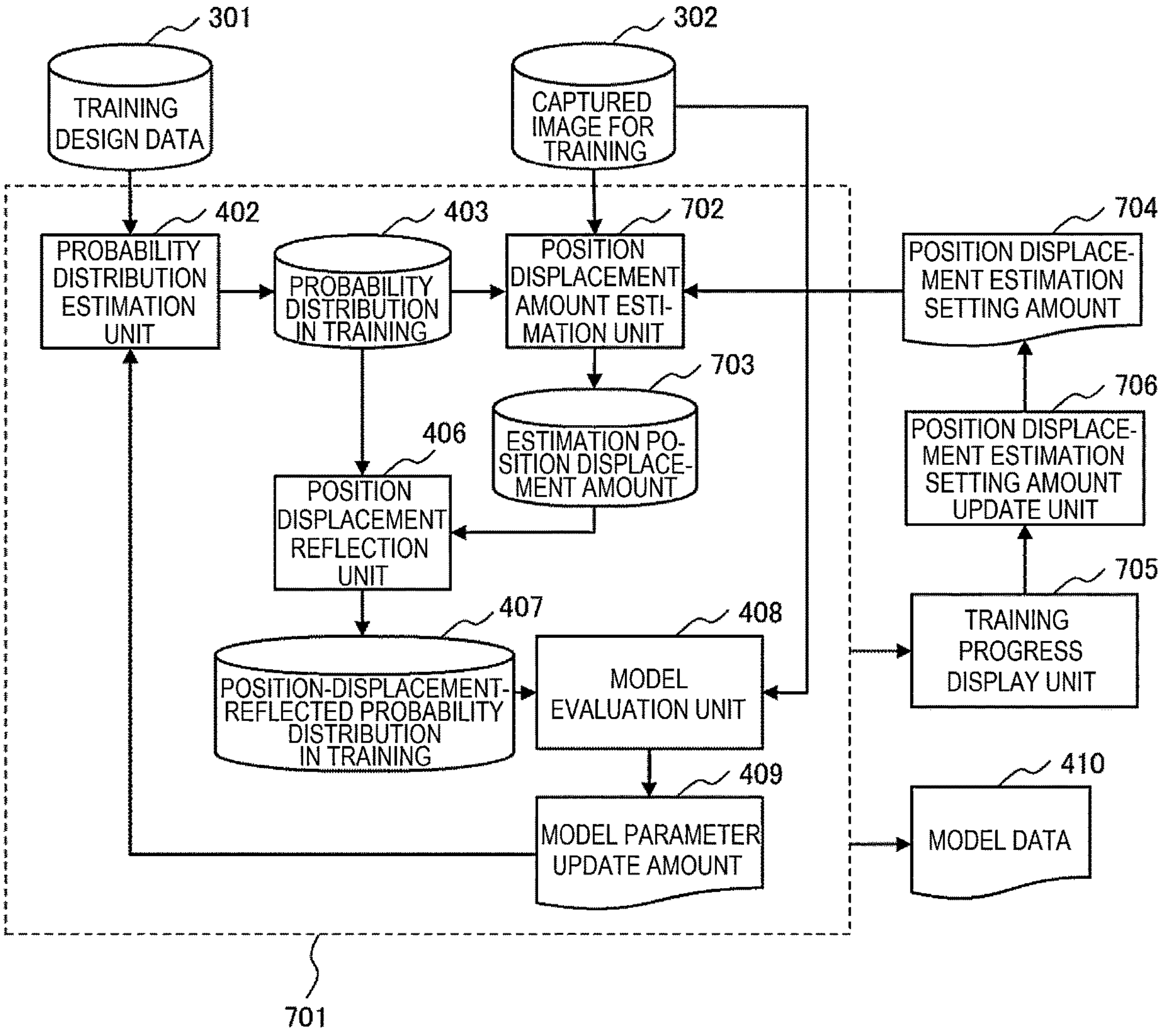
[FIG. 8]
| NUMBER OF TRAINING STEPS | POSITION DISPLACEMENT AMOUNT REFLECTION | UPPER LIMIT OF POSITION DISPLACEMENT AMOUNT | . . . |
|---|---|---|---|
| 0 | OFF | — | . . . |
| 400 | ON | 2 PIXELS | . . . |
| 1000 | — | 5 PIXELS | . . . |
| 10000 | — | ABSENCE | . . . |

[FIG. 9]
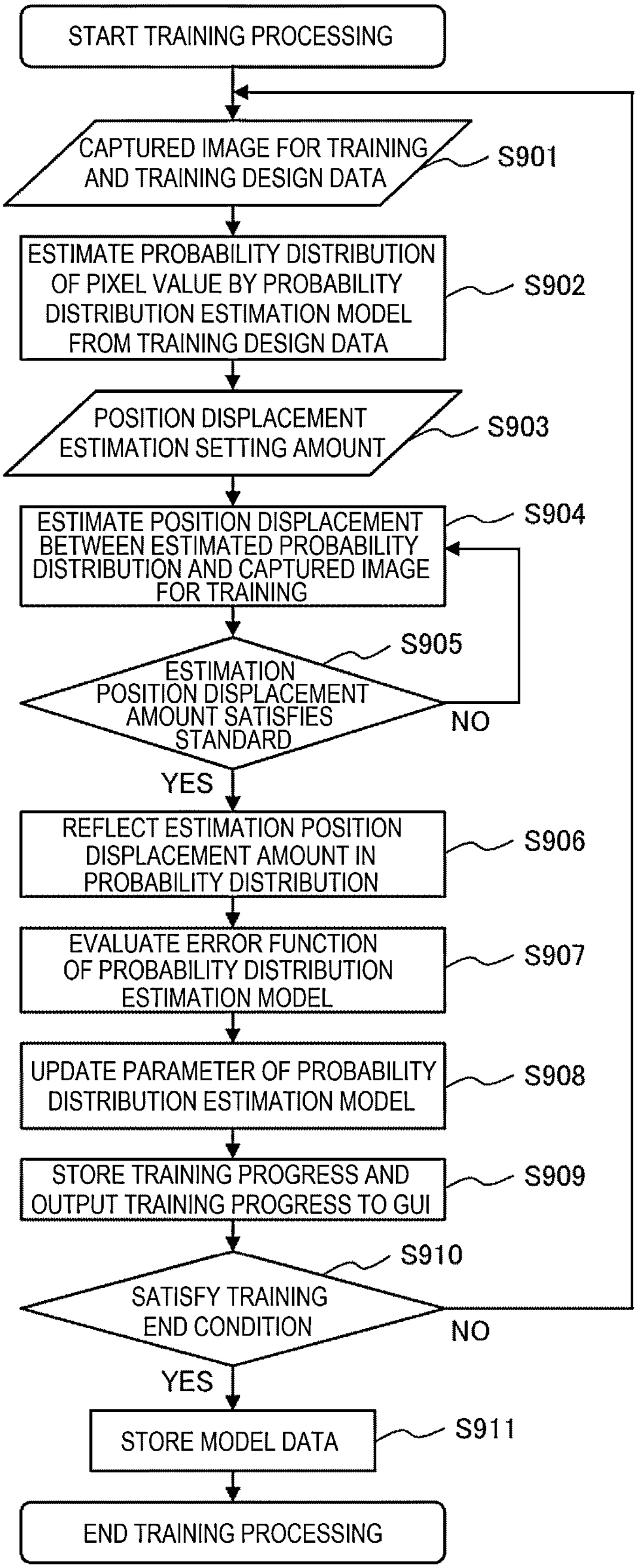

[FIG. 10]
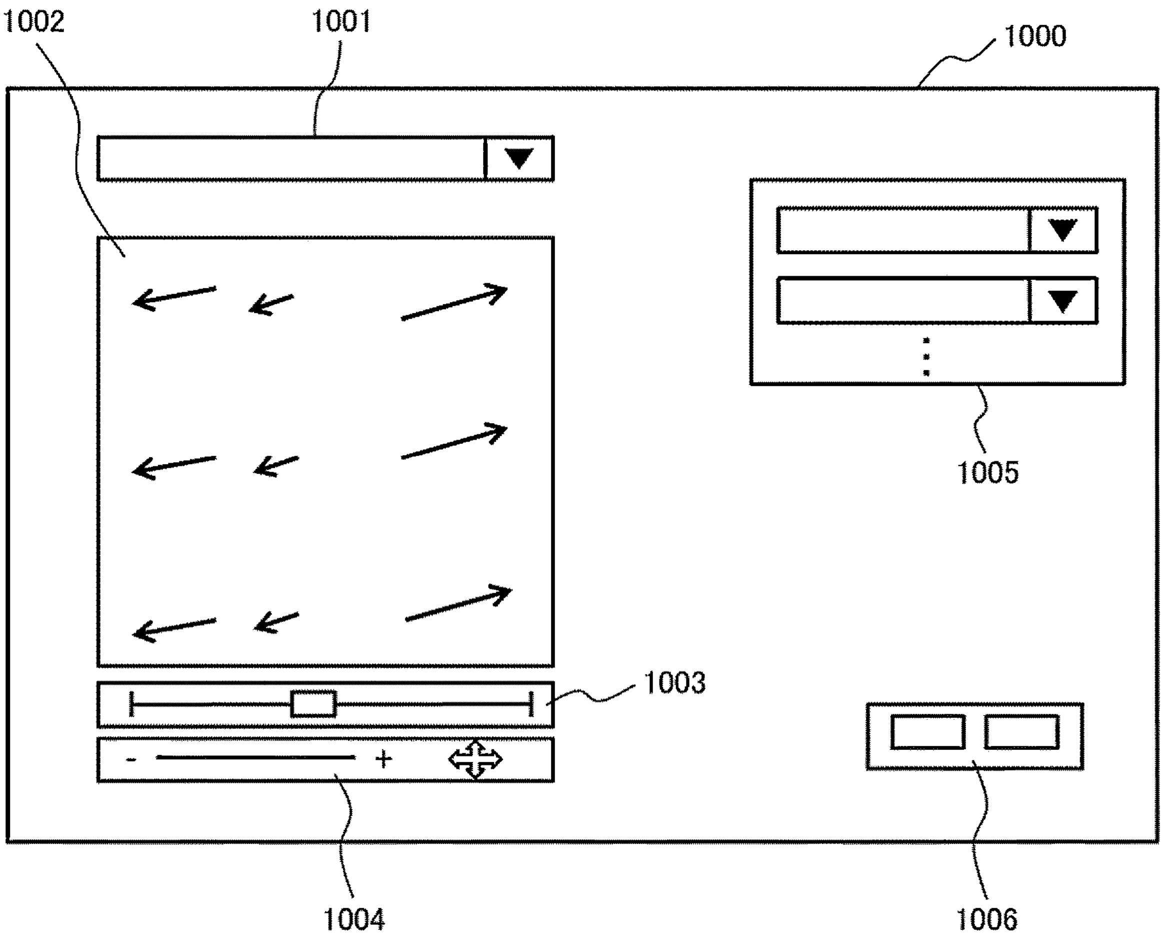

[FIG. 11]
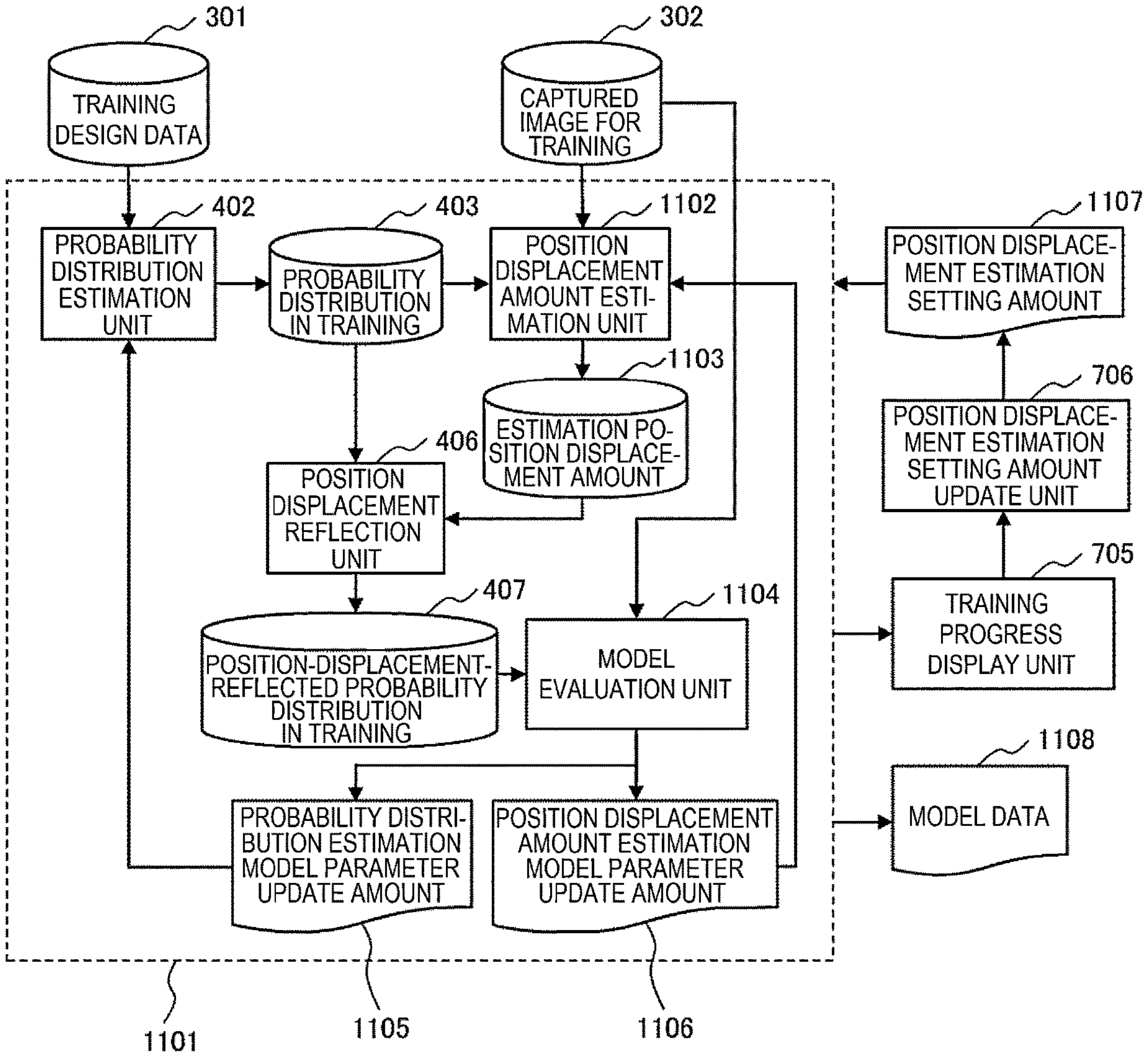

[FIG. 12]
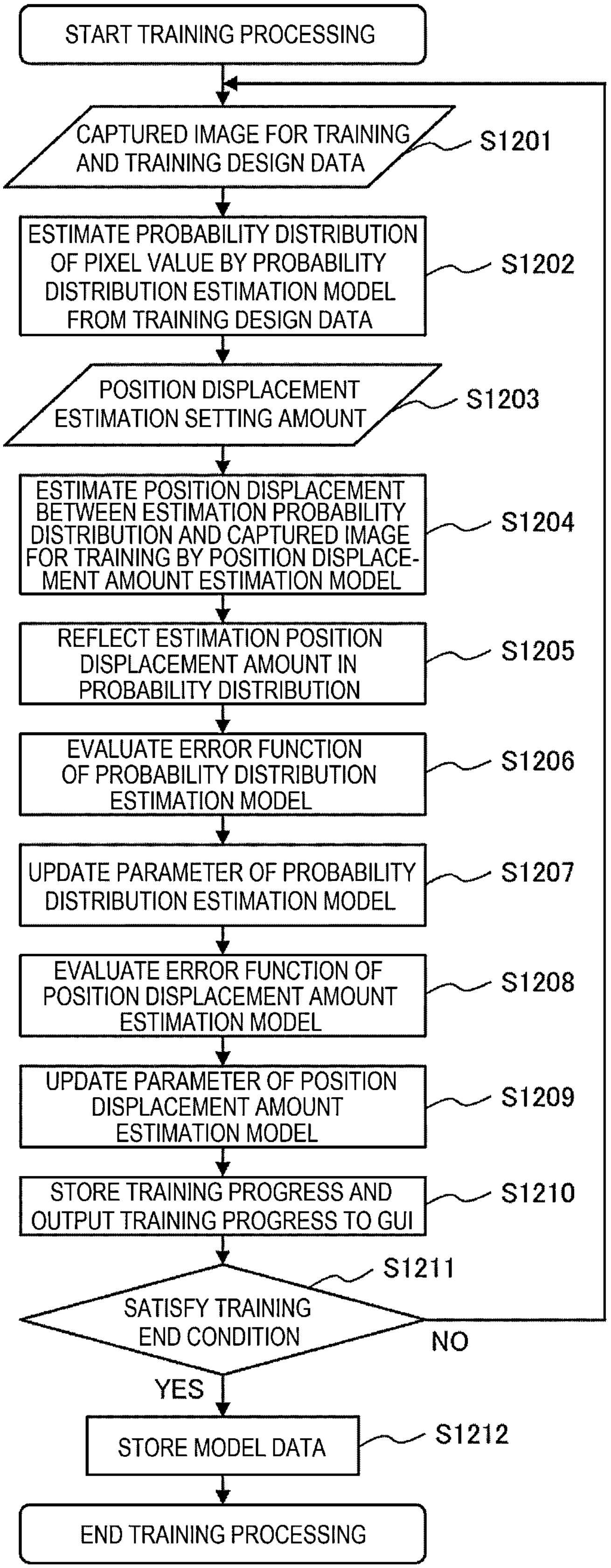

[FIG. 13]
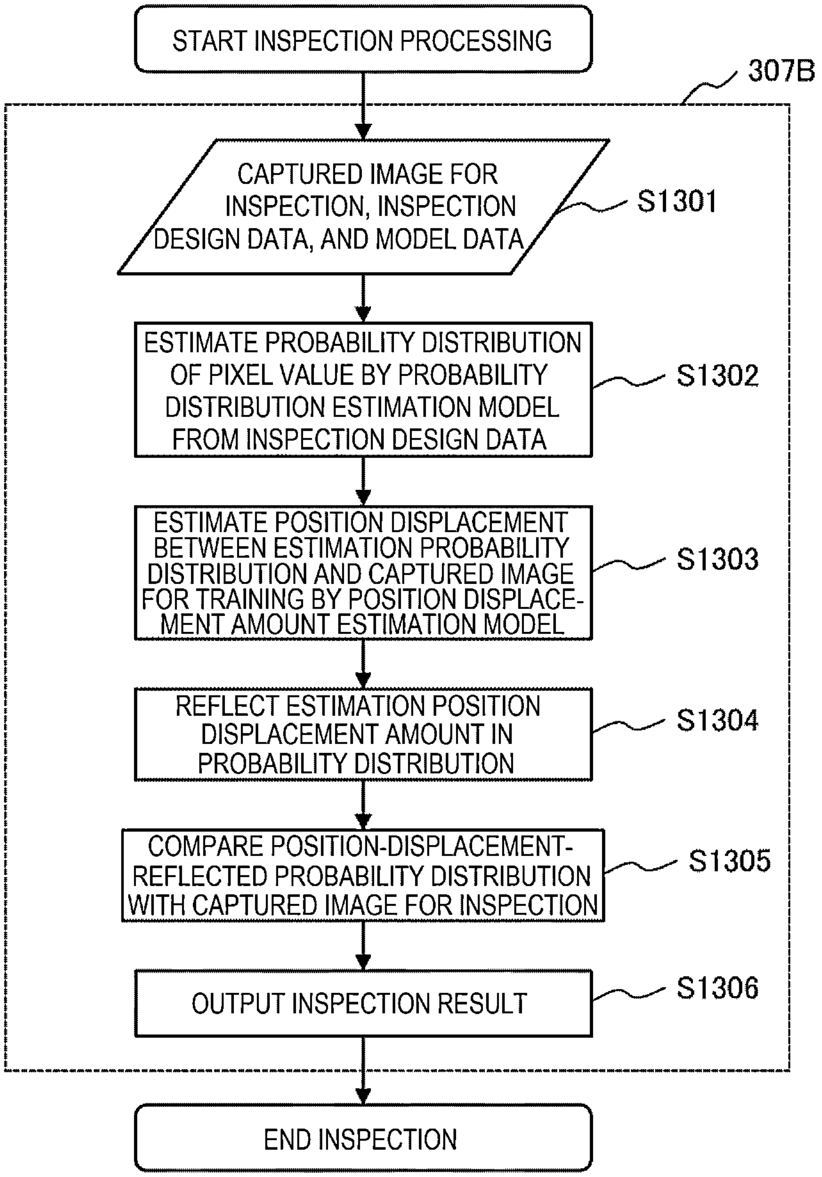

IMAGE INSPECTION EQUIPMENT AND IMAGE PROCESSING METHOD

TECHNICAL FIELD

The present invention relates to an image processing technique for processing image data, and particularly to a technique that is effective when applied to an inspection using the image data.

BACKGROUND ART

To perform an evaluation such as a defect inspection in a semiconductor circuit, design data of a sample, which is an inspection target, is compared with imaged data obtained by capturing an image of the inspection target.

With the miniaturization of a semiconductor circuit pattern, it is becoming difficult to form a circuit pattern on a wafer as designed, and a defect in which a width or a shape of a wiring differs from a design value is likely to occur. Since such a defect is referred to as a systematic defect and is commonly generated in all dies, it is difficult to detect the defect by a method (die-to-die inspection) of detecting a defect by comparing a die of an inspection target with an adjacent die. A semiconductor device manufactured from a die including an undetected defect may become a defective product in another inspection executed in a final test or the like, and the yield may decrease.

In contrast, there is a method (die to database inspection) of detecting a defect by comparing a design data image obtained by imaging design data such as CAD data with the die of the inspection target instead of the adjacent die. In the die-to-database inspection, since the design data is compared with the die of the inspection target, a systematic defect can be theoretically detected.

As a background art of the present technical field, for example, there is a technique as disclosed in PTL 1. PTL 1 discloses a method in which to allow a false detection according to a shape deviation between design data and a captured image of an inspection target, which does not affect electrical characteristics of a semiconductor device, a probability distribution of a pixel value of a captured image is estimated from design data by machine learning, and an allowable shape deviation is expressed as a variation in the probability distribution as a manufacturing margin.

CITATION LIST

Patent Literature

PTL 1: WO2020/250373

SUMMARY OF INVENTION

Technical Problem

When the probability distribution of the pixel value of the captured image is trained as in PTL 1 described above, it is important to align patterns of the design data used in training data and the captured image in advance, and pattern mismatch reduces a training accuracy of the probability distribution and causes a decline in inspection performance.

However, in the captured image captured by an inspection equipment, an image distortion due to the image capturing may occur, and a non-linear and local position displacement in which the pre-alignment is difficult may occur between the design data and the captured image. For example, in image capturing by a scanning electron microscope (SEM), an image distortion due to charging of a sample by an electron beam may occur.

In PTL 1, to train the probability distribution of the pixel value of the captured image, it is assumed that the pre-alignment is sufficiently performed on the training design data and the captured image. When training is performed by using the captured image including the image distortion due to the image capturing and having the non-linear and local position displacement in which the pre-alignment is difficult, the position displacement is modeled as the manufacturing margin, and the variation in the probability distribution increases. As a result, inspection sensitivity may decrease in an inspection of comparing the captured image with the probability distribution.

Therefore, an object of the invention is to provide an image inspection equipment and an image processing method capable of preventing a decrease in accuracy of an estimation value of a probability distribution caused by a position displacement between design data and a captured image of a sample in image processing in which a model for estimating a probability distribution of a pixel value of the captured image is trained by using the design data and the captured image.

Solution to Problem

To solve the technical problem described above, the invention is an image inspection equipment for inspecting a captured image of a sample by using design data of the sample and the captured image, the image inspection equipment including: a training processing unit configured to train a probability distribution estimation model for estimating a probability distribution of a pixel value of the captured image from the design data; and an inspection processing unit configured to inspect a captured image for inspection by using the probability distribution estimation model created by the training processing unit, inspection design data, and the captured image for inspection, in which e training processing unit includes: a probability distribution estimation unit configured to estimate a probability distribution of a pixel value of a captured image for training of the sample from training design data of the sample; a position displacement amount estimation unit configured to estimate a position displacement amount between a probability distribution in training estimated by the probability distribution estimation unit and the captured image for training; a position displacement reflection unit configured to reflect an estimation position displacement amount estimated by the position displacement amount estimation unit in the probability distribution in training; and a model evaluation unit configured to evaluate a probability distribution estimation model of the probability distribution estimation unit by using the captured image for training and a position-displacement-reflected probability distribution in training calculated by the position displacement reflection unit, and update a parameter of the probability distribution estimation model according to an evaluation value.

In addition, the invention is an image processing method for training a model for estimating a probability distribution of a pixel value of a captured image of a sample by using design data of the sample and the captured image, the image processing method including: (a) a step of estimating a probability distribution in training of a pixel value of a captured image for training of the sample from training design data of the sample; (b) a step of estimating a position displacement amount between the probability distribution in training estimated in the (a) step and the captured image for training; (c) a step of reflecting the position displacement amount estimated in the (b) step in the probability distribution in training; and (d) a step of evaluating a probability distribution estimation model estimated in the (a) step by using a position-displacement-reflected probability distribution in training calculated in the (c) step and the captured image for training, and updating a parameter of the probability distribution estimation model according to an evaluation value.

Advantageous Effects of Invention

According to the invention, an image inspection equipment and an image processing method can be implemented, capable of preventing a decrease in accuracy of an estimation value of a probability distribution caused by a position displacement between design data and a captured image of a sample in image processing in which a model for estimating a probability distribution of a pixel value of the captured image is trained by using the design data and the captured image.

Accordingly, it is possible to prevent an increase in a variation in the probability distribution caused by the position displacement of the pattern between the design data and the captured image and to train a model for estimating a probability distribution that is suitable for an image inspection and that can only consider deformation due to the manufacturing margin.

As a result, the inspection accuracy can be improved in the image inspection for comparing the captured image with the probability distribution.

Problems, configurations, and effects other than those described above will be made clear by the following description of the embodiments.

BRIEF DESCRIPTION OF DRAWINGS

FIG. 1A is a diagram illustrating an example of design data.

FIG. 1B is a diagram illustrating an example of a captured image.

FIG. 1C is a diagram illustrating an example of a position displacement between the design data and the captured image.

FIG. 2A is a diagram illustrating an example of a probability distribution in which a variation is increased due to the position displacement between the design data included in training data and the captured image.

FIG. 2B is a diagram illustrating an example of a probability distribution estimated based on a model trained by a training processing unit according to one embodiment of the invention.

FIG. 3 is a functional block diagram illustrating an overall configuration example of an inspection equipment according to one embodiment of the invention.

FIG. 4 is a functional block diagram illustrating a configuration of a training processing unit according to Embodiment 1.

FIG. 5 is a flowchart illustrating a processing operation of the training processing unit according to Embodiment 1.

FIG. 6 is a flowchart illustrating a processing operation of an inspection processing unit of the inspection equipment according to Embodiment 1.

FIG. 7 is a functional block diagram illustrating a configuration of a training processing unit according to Embodiment 2.

FIG. 8 is a diagram illustrating an example of a position displacement estimation setting amount according to Embodiment 2.

FIG. 9 is a flowchart illustrating a processing operation of the training processing unit according to Embodiment 2.

FIG. 10 is a diagram illustrating an example of a GUI screen of a training progress display unit and a position displacement estimation setting amount update unit according to Embodiment 2.

FIG. 11 is a functional block diagram illustrating a configuration of a training processing unit according to Embodiment 3.

FIG. 12 is a flowchart illustrating a processing operation of the training processing unit according to Embodiment 3.

FIG. 13 is a flowchart illustrating a processing operation of an inspection processing unit of an inspection equipment according to Embodiment 3.

DESCRIPTION OF EMBODIMENTS

Hereinafter, embodiments according to the invention will be described with reference to the drawings. In the drawings, the same configurations are denoted by the same reference signs, and a detailed description of the repeating parts is omitted.

An inspection equipment described in the present specification relates to an image inspection equipment and an image processing method using the same capable of estimating a position displacement between design data and a captured image in training of a model for estimating a probability distribution of a pixel value of the captured image, reflecting the position displacement in an estimation probability distribution, and performing training to prevent an increase in a variation of the estimated probability distribution.

In the present specification, a semiconductor circuit imaged by a scanning electron microscope (SEM) is used as a sample and a captured image thereof, and the invention is not limited thereto. Needless to say, the invention can also be applied to an image captured by other imaging devices.

Embodiment 1

An image inspection equipment and an image processing method using the same according to Embodiment 1 of the invention will be described with reference to FIGS. 1A to 6.

First, an example of design data and a captured image according to the present embodiment will be described with reference to FIGS. 1A to 1C.

FIG. 1A is a diagram illustrating an example of the design data of a semiconductor circuit. As illustrated in FIG. 1A, the design data is obtained by imaging design data such as layout data of the semiconductor circuit and CAD data in which manufacturing conditions are registered. Design data 101 in FIG. 1A illustrates an example of a binary image in which a wiring portion and a space portion of a circuit pattern are colored separately, and the wiring portion may have multiple layers of two or more layers in the semiconductor circuit. For example, if a wiring is one layer, a binary image of the wiring portion and the space portion can be used, and if the wiring is two layers, a ternary image of the wiring portion of a lower layer, the wiring portion of an upper layer, and the space portion can be used.

The design data may be an image having values of two or more dimensions, such as a color image to express the manufacturing conditions of the semiconductor circuit, or may be an image expressed by a continuous value, and is not limited to an image having a one-dimensional discrete value.

FIG. 1B is a diagram illustrating an example of the captured image corresponding to the design data 101. FIG. 1C is an example in which the design data 101 is displayed by a dotted line and superimposed on a captured image 102 and is a diagram illustrating a position displacement of a circuit pattern between the design data 101 and the captured image 102. As illustrated in FIG. 1C, there is a position displacement between the design data 101 and the captured image 102, and an intensity of the position displacement increases toward a left side of the image. Such a position displacement occurs due to, for example, a control defect of an electron beam emitted from an electron source during the imaging by the scanning electron microscope, an image distortion caused by a change in an emission amount or an electron trajectory of secondary electrons or backscattered electrons emitted from the sample when the sample is charged by scanning with the electron beam, and the like.

Here, the position displacement in a left-right direction is illustrated as an example of the position displacement, and the position displacement is not limited thereto. For example, any position displacement may be used such as a a non-linear translational displacement, rotational displacement, or a displacement in which the wiring is in a wavy shape. In the case of a position displacement caused by a configuration of a manufacturing device or an imaging device of the semiconductor circuit or caused by a device due to a setting amount, it is possible to obtain a magnitude and a direction of the position displacement by a simulation by a prior analysis. In such a case, the captured image may be obtained by correcting the position displacement caused by the device in advance.

FIG. 3 is a functional block diagram illustrating an overall configuration example of an inspection equipment according to one embodiment of the invention.

As illustrated in FIG. 3, the inspection equipment includes a training processing unit 303 and an inspection processing unit 307. Here, the training processing unit 303 and the inspection processing unit 307 are implemented by, for example, a processor such as a CPU (not illustrated), a ROM that stores various programs, a RAM that temporarily stores data in a calculation process, and a storage device such as an external storage device, and the processor such as a CPU reads and executes the various programs stored in the ROM, and stores a calculation result, which is an execution result, in the RAM, the external storage device, or a cloud storage via a network connection.

The training processing unit 303 trains a model for estimating a probability distribution of a pixel value of the captured image from the design data by using training design data 301 and a captured image for training 302.

The inspection processing unit 307 inspects a captured image for inspection 306 by using model data 304 created by the training processing unit 303, inspection design data 305, and captured image for inspection 306, and outputs an inspection result 308.

Here, training processing in the training processing unit 303 and inspection processing in the inspection processing unit 307 may be performed simultaneously or individually. If a computer that executes the inspection processing unit 307 can acquire the model data 304 via a network connection or the like, the inspection processing unit 307 may be implemented to be executed by a computer different from that of the training processing unit 303.

FIG. 4 is a functional block diagram illustrating a specific configuration example of a training processing unit 401 according to the present embodiment corresponding to the training processing unit 303 in FIG. 3.

The training processing unit 401 according to the present embodiment includes a probability distribution estimation unit 402, a position displacement amount estimation unit 404, a position displacement reflection unit 406, and a model evaluation unit 408, outputs model data 410 when completing predetermined training processing, and stores the model data 410 in a RAM, an external storage device, or a cloud storage via a network connection.

The probability distribution estimation unit 402 estimates a probability distribution of a pixel value of the corresponding captured image for training 302 from the training design data 301 by a model using machine learning and outputs a probability distribution in training 403. The estimation probability distribution is represented by the design data or a parameter of the probability distribution corresponding to each pixel of the captured image.

Examples of a probability distribution to be estimated include an mean and a standard deviation in the case of a normal distribution, and an arrival rate in the case of a Poisson distribution. A probability distribution estimation model for estimating the probability distribution of the pixel value of the captured image uses, for example, a convolution neural network (CNN) of an encode-decoder type such as a U-Net or a CNN having another structure, and is not limited to the CNN.

The position displacement amount estimation unit 404 estimates a position displacement amount between the probability distribution in training 403 estimated by the probability distribution estimation unit 402 the captured image for training 302 and outputs an estimation position displacement amount 405. The estimation position displacement amount 405 is represented by the design data or a two-dimensional vector amount (dx, dy) corresponding to each pixel of the captured image, and when each pixel of the estimation probability distribution is moved by a corresponding vector amount, the pixel value of the captured image is made to better follow the distribution. Here, although the vector amount is exemplified as a form of the estimation position displacement amount 405, the estimation position displacement amount 405 may be a parameter such as a rotation angle or a translational displacement amount, or a combination of a plurality of forms when it is assumed that the estimation position displacement amount 405 is a distortion amount that can be formulated such as a rotational displacement or a translational displacement.

The position displacement reflection unit 406 reflects a position displacement represented by the estimation position displacement amount 405 in the probability distribution in training 403 and outputs a position-displacement-reflected probability distribution in training 407.

The model evaluation unit 408 evaluates the probability distribution estimation model of the probability distribution estimation unit 402 by using the captured image for training 302 and the position-displacement-reflected probability distribution in training 407, calculates an update amount of the parameter of the probability distribution estimation model according to an evaluation value, and updates the parameter of the probability distribution estimation model according to the update amount (model parameter update amount 409). At this time, the update amount of the parameter is calculated such that the pixel value of the captured image for training 302 better follows the position-displacement-reflected probability distribution in training 407.

FIG. 5 is a flowchart illustrating a processing operation of the training processing unit 401 according to the present embodiment. As illustrated in FIG. 5, when the training processing is started, the captured image for training 302 and the training design data 301 are input to the training processing unit 401 in step S501.

In step S502, the probability distribution estimation unit 402 implementing the training processing unit 401 estimates the probability distribution of the pixel value of the corresponding captured image for training 302 from the input training design data 301 by using the probability distribution estimation model and outputs the probability distribution in training 403.

In step S503, the position displacement amount estimation unit 404 implementing the training processing unit 401 estimates the position displacement amount between the probability distribution in training 403 and the captured image for training 302 from the probability distribution in training 403 and the input captured image for training 302.

Examples of an estimation method include a method in which an initial value of any or random position displacement amount is set, and the position displacement amount is updated according to an evaluation value in step S504 to be described later.

More specifically, there is a method of solving, by a dynamic programming method or the like, an optimization problem of minimizing an evaluation value calculated based on an evaluation function d(R, f(I, D)) with respect to a probability distribution R, a captured image I, a position displacement reflection processing function f, an estimation position displacement amount D, and a distance function d for evaluating a difference between the probability distribution R and the captured image I. The distance function d is for evaluating a difference between the probability distribution and the captured image, and includes a negative log-likelihood. Further, if the probability distribution is a normal distribution, an absolute error or a square error of a pixel value between the mean thereof and the captured image may be used.

In step S504, the position displacement amount estimation unit 404 evaluates the position displacement amount estimated in step S503, determines whether the evaluation value satisfies an evaluation standard, and outputs the estimation position displacement amount 405 if the evaluation standard is satisfied (YES). When the evaluation standard is not satisfied (NO), the processing returns to step S503, and the processing in step S503 is executed again.

Examples of the evaluation value include a value of a function for evaluating the difference between the probability distribution and the captured image that is calculated based on the distance function d. Examples of the evaluation standard include that if the captured image follows the probability distribution as the evaluation value becomes smaller, the evaluation value is equal to or less than a specified value, if the captured image follows the probability distribution as the evaluation value becomes larger, the evaluation value is equal to or larger than a specified value, and the processing from step S503 to step S504 is performed a specified number of times or more.

In step S505, the position displacement reflection unit 406 implementing the training processing unit 401 reflects a position displacement represented by the estimation position displacement amount 405 in the probability distribution in training 403 and outputs the position-displacement-reflected probability distribution in training 407.

Examples of a method of reflecting the position displacement amount include a method of shifting a value of each pixel of the probability distribution to another pixel according to the vector amount if the position displacement amount is a two-dimensional vector format. Furthermore, if the parameter of the position displacement can be formulated, such as a translational displacement or a rotational displacement, affine transformation using the parameter may be used.

In step S506, the model evaluation unit 408 implementing the training processing unit 401 evaluates an error function or a loss function of the probability distribution estimation model of the probability distribution estimation unit 402 by using the input captured image for training 302 and the position-displacement-reflected probability distribution in training 407. Examples of the error function or the loss function of the probability distribution estimation model include a negative log-likelihood of the position-displacement-reflected probability distribution in training 407 with respect to the captured image for training 302, an absolute error or a square error between an image sampled from the position-displacement-reflected probability distribution in training 407 and the pixel value of the captured image for training 302.

In step S507, the model evaluation unit 408 calculates the update amount of the parameter of the probability distribution estimation model to reduce the error function or the loss function of the probability distribution estimation model of the probability distribution estimation unit 402 based on an evaluation result in step S506 and updates the parameter according to the update amount. The update is performed by, for example, a stochastic gradient descent method.

In step S508, the training processing unit 401 determines whether a training end condition has been reached, the processing proceeds to step S509 if it is determined that the training end condition has been reached (YES), and the training processing unit 401 stores the model data 410 including the parameter of the probability distribution estimation model of the probability distribution estimation unit 402 and ends the training processing. On the other hand, when it is determined that the training end condition has not been reached (NO), the processing returns to step S501, and the processing after step S501 is executed again.

Examples of the training end condition include whether the processing from step S501 to step S507 is repeated a predetermined number of times or more, whether it is determined that a value of the error function of the probability distribution estimation model obtained in step S506 is not reduced even when the processing from step S501 to step S507 is repeated a predetermined number of times and the training of the probability distribution estimation model of the probability distribution estimation unit 402 has converged, or the like.

FIG. 6 is a flowchart illustrating a processing operation of an inspection processing unit 307A according to the present embodiment, which corresponds to the inspection processing unit 307 in FIG. 3.

As illustrated in FIG. 6, when the inspection processing is started, in step S601, the captured image for inspection 306, the inspection design data 305, and the model data 410 including the parameter of the probability distribution estimation model trained by the training processing unit 401 are input to the inspection processing unit 307A.

In step S602, the inspection processing unit 307A estimates the probability distribution of the pixel value of the corresponding captured image for inspection 306 by using the input inspection design data 305 and the probability distribution estimation model included in the model data 410.

In step S603, the inspection processing unit 307A estimates a position displacement between the probability distribution estimated in step S602 and the captured image for inspection 306 by the same method as step S503 of the training processing unit 401 illustrated in FIG. 5.

Here, an example in which the position displacement amount is estimated in the inspection processing is described, but when the same estimation position displacement amount 405 is obtained in most cases in a plurality of combinations of the design data and the captured image included in the training design data 301 and the captured image for training 302 in the training processing unit 401, it is possible to determine that the position displacement between the probability distribution estimated from the design data and the captured image is a position displacement derived from the device. In such a case, an mean value of the estimation position displacement amounts obtained in the training processing may be stored as a representative position displacement amount and may be an output in step S603.

In step S604, the inspection processing unit 307A evaluates the position displacement amount estimated in step S603, determines whether the evaluation value satisfies the evaluation standard, and outputs the estimation position displacement amount of the captured image for inspection 306 when the evaluation standard is satisfied (YES). When the evaluation standard is not satisfied (NO), the processing returns to step S603, and the processing in step S603 is executed again.

Examples of the evaluation standard include a value of a function for evaluating a difference between the probability distribution and the captured image similar to those in step S504 of the training processing unit 401 illustrated in FIG. 5, and execution of the processing of step S603 and step S604 for a specified number of times or more.

In step S605, the inspection processing unit 307A reflects the position displacement in the probability distribution estimated in step S602 by using the position displacement amount estimated in step 603, and outputs a position-displacement-reflected probability distribution.

In step S606, the inspection processing unit 307A compares the position-displacement-reflected probability distribution obtained in step S605 with the captured image for inspection 306 and performs a defect inspection.

As a comparison method, a method is used in which when a probability distribution corresponding to a pixel value x of an inspection image follows a normal distribution, an abnormality degree represented by $|x-\mu|/\sigma$ is calculated by using an mean $\mu$ and a standard deviation $\sigma$, and a pixel having an abnormality degree exceeding a specified threshold is regarded as a defect.

In step S607, the inspection processing unit 307A outputs the inspection result of step S606, stores the inspection result in the RAM, the external storage device, the cloud storage, or the like or displays the inspection result on a graphical user interface (GUI) or the like, and ends the inspection processing.

Effects of the present embodiment will be described with reference to FIGS. 2A and 2B. FIG. 2A is an example of an estimation probability distribution (mean image, standard deviation image) of a probability distribution estimation model trained by using the method disclosed in PTL 1 with respect to the training data having a position displacement between the design data and the captured image as illustrated in FIGS. 1A and 1B. FIG. 2B is an example of an estimation probability distribution of the probability distribution estimation model trained by the present embodiment. Each image illustrated in FIGS. 2A and 2B illustrates a value of a probability distribution in which a luminance value is estimated.

In the method disclosed in PTL 1, since it is assumed that there is no position displacement other than the manufacturing margin between the design data and the captured image, when a captured image having a non-linear and local position displacement that is difficult to perform matching in advance is included in the training data, the position displacement of the pixel value is trained as the variation of the pixel value caused by the manufacturing margin.

As a result, as illustrated in FIG. 2A, an edge of the circuit pattern represented by the mean image of the estimation probability distribution is ambiguous, and the standard deviation image has a large value at the edge of the circuit pattern. When the defect inspection in step S606 by the inspection processing unit 307A is executed by using such a probability distribution, the abnormality degree in the vicinity of the edge of the circuit pattern is evaluated to be small, and therefore an undetection of the defect occurs.

In contrast, in the present embodiment, in the training of the model for estimating the probability distribution of the pixel value of the captured image, the position displacement between the estimation probability distribution and the captured image is sequentially estimated, and the training for optimizing the position-displacement-reflected probability distribution obtained by reflecting the position displacement in the estimation probability distribution is executed, thereby preventing an increase in the variation in the probability distribution due to the position displacement other than the manufacturing margin between the design data and the captured image.

As a result, it is possible to obtain an mean image with a clear edge of the circuit pattern and a standard deviation image in which only the manufacturing margin is a variation, which are illustrated in FIG. 2B.

In addition, as another effect of the present embodiment, since the deterioration in training accuracy of the probability distribution caused by the position displacement between the training design data and the captured image for training can be reduced, it is possible to reduce the required accuracy of the pre-alignment of the design data and captured image and to reduce the cost of forming the training data.

Embodiment 2

An image inspection equipment and an image processing method using the same according to Embodiment 2 of the invention will be described with reference to FIGS. 7 to 10.

FIG. 7 is a functional block diagram illustrating a configuration of a training processing unit 701 according to Embodiment 2 of the invention.

The training processing unit 701 according to the present embodiment corresponds to the training processing unit 401 in Embodiment 1 (FIG. 4) described above, and is different from the training processing unit 401 in that the training processing unit 701 includes an input of a position displacement estimation setting amount 704 for stabilizing training of a probability distribution suitable for inspection based on a restriction of a position displacement amount corresponding to the number of training steps such as a maximum value of an estimated position displacement amount in a position displacement amount estimation unit 702.

In addition, the training processing unit 701 is different from the training processing unit 401 in that the training processing unit 701 includes a training progress display unit 705 that records s a result obtained by visualizing the probability distribution in training 403, the position-displacement-reflected probability distribution in training 407, and an estimation position displacement amount 703 for each training step and displays the result on the GUI, and a position displacement estimation setting amount update unit 706 that allows a user to update the position displacement estimation setting amount 704 for stabilizing the training of the probability distribution based on a display result of the training progress display unit 705.

As illustrated in FIG. 7, the training processing unit 701 according to the present embodiment includes the probability distribution estimation unit 402, the position displacement amount estimation unit 702, the position displacement reflection unit 406, the model evaluation unit 408, the training progress display unit 705, and the position displacement estimation setting amount update unit 706, outputs the model data 410 when predetermined training processing is ended, and stores the model data 410 in a RAM, an external storage device, or a cloud storage via a network connection. Hereinafter, differences from Embodiment 1 will be described.

The position displacement amount estimation unit 702 estimates a position displacement amount between the probability distribution in training 403 estimated by the probability distribution estimation unit 402 and the captured image for training 302 and outputs the estimation position displacement amount 703. At this time, the position displacement amount satisfying a restriction condition corresponding to the training step set by the position displacement estimation setting amount 704 is estimated.

The training progress display unit 705 records the result obtained by visualizing the probability distribution in training 403, the position-displacement-reflected probability distribution in training 407, and the estimation position displacement amount 703 for each training step and displays the result on the GUI.

The position displacement estimation setting amount update unit 706 allows the user to update the position displacement estimation setting amount 704 for stabilizing the training of the probability distribution based on the display result of the training progress display unit 705, and performs the training processing again by using the updated position displacement estimation setting amount 704.

FIG. 8 is a diagram illustrating an example of the position displacement estimation setting amount 704 according to the present embodiment.

By setting the presence or absence of position displacement amount reflection processing corresponding to the training step or setting an upper limit to a magnitude of the estimation position displacement amount, the position displacement estimation setting amount 704 prevents the estimation position displacement amount 703 from becoming a large vector amount exceeding an image size at an initial training stage in which the probability distribution in training 403 cannot express the circuit pattern sufficiently. Further, in the circuit with a repeating pattern as illustrated in FIG. 1A, the position displacement amount shifted by one cycle is not predicted.

Accordingly, training of the probability distribution estimation model can be stabilized in the invention in which training is executed to optimize the position-displacement-reflected probability distribution.

In the example illustrated in FIG. 8, it is set that the processing of the position displacement reflection unit 406 is not executed from 0 to 400 in the number of training steps. At this time, a norm of a vector of the estimation position displacement amount is 0 for all the pixels. In addition, it is set that the norm of the estimation position displacement amount is limited to two pixels when the number of training steps is 400 to 1000, the norm of the estimation position displacement amount is limited to five pixels when the number of training steps is 1000 to 10000, and there is no limitation to the norm of the estimation position displacement amount when the number of training steps is 10000 or more.

In particular, since the accuracy of the position displacement amount estimation decreases in the initial stage of training and the training of the probability distribution estimation model is unstable, it is recommended that the restriction is relaxed as the number of training steps increases. The position displacement estimation setting amount illustrated in FIG. 8 is an example, and the content of the restriction and the value of the parameter are determined according to the circuit size, the circuit pattern shape of a training target sample, or the estimation method of the position displacement amount, and therefore are not limited thereto.

FIG. 9 is a flowchart illustrating a processing operation of the training processing unit 701 according to the present embodiment. Differences from Embodiment 1 illustrated in FIG. 5 will be described.

In step S903, the position displacement amount estimation unit 702 receives the input of the position displacement estimation setting amount 704.

In step S904, the position displacement amount estimation unit 702 implementing the training processing unit 701 estimates the position displacement amount between the probability distribution in training 403 and the captured image for training 302 from the probability distribution in training 403 and the input captured image for training 302.

At this time, the position displacement amount satisfying the restriction condition set in the position displacement estimation setting amount 704 is estimated. More specifically, as described in step S503 in FIG. 5, there is a method of solving, by a dynamic programming method or the like, an optimization problem with the restriction in which the restriction condition set to the position displacement estimation setting amount 704 is added with respect to a method of minimizing an evaluation value calculated based on an evaluation function d(R, f(I, D)) with respect to the probability distribution R, the captured image I, the position displacement reflection processing function f, the estimation position displacement amount D, and the distance function d for evaluating a difference between the probability distribution R and the captured image I.

In step S905, the position displacement amount estimation unit 702 evaluates the position displacement amount estimated in step S904, determines whether the evaluation value satisfies an evaluation standard, and outputs the estimation position displacement amount 703 if the evaluation standard is satisfied (YES). When the evaluation standard is not satisfied (NO), the processing returns to step S904, and the processing in step S904 is executed again.

Examples of the evaluation value include a value of a function for evaluating the difference between the probability distribution and the captured image that is calculated based on the distance function d. Examples of the evaluation standard include that if the captured image follows the probability distribution as the evaluation value becomes smaller, the evaluation value is equal to or less than a specified value, if the captured image follows the probability distribution as the evaluation value becomes larger, the evaluation value is equal to or larger than a specified value, the processing from step S904 and step S905 is performed a specified number of times or more, and the restriction condition set in the position displacement estimation setting amount 704 is satisfied a predetermined number or more.

In step S909, the training processing unit 701 stores a training progress including the probability distribution in training 403 estimated in step S902, the estimation position displacement amount 703 estimated in step S904, and the position-displacement-reflected probability distribution in training 407 calculated in step S906 in a RAM, an external storage device, or a storage in association with the number of training steps, outputs the training progress to the GUI of the training progress display unit 705, and presents the training progress to the user.

At this time, the probability distribution in training 403, the estimation position displacement amount 703, and the position-displacement-reflected probability distribution in training 407 are converted into a format recognizable by the user and displayed on the GUI.

For example, the probability distribution can be displayed as an image in which a value of a parameter corresponding to each pixel is a luminance value. Further, by superimposing and displaying the corresponding training design data 301 or the captured image for training 302, whether the probability distribution is a probability distribution suitable for the inspection can be displayed in a confirmable format.

When the position displacement amount is in a vector format, the position displacement amount can be displayed as an image in which an arrow indicating the norm and the direction of the vector amount is drawn for each pixel or at a specified pixel interval. The position displacement amount can also be displayed by being converted into a color image in an HSV color space where the norm of the vector amount is the brightness and the direction thereof is the hue. When the position displacement amount can be formulated and the parameter thereof is in a numerical value format, the position displacement amount can be displayed as a graph with a horizontal axis being the number of training steps and a vertical axis being a numerical value, or can be directly displayed using the numerical value thereof as a character string.

FIG. 10 is an example of a GUI screen of the training progress display unit 705 and the position displacement estimation setting amount update unit 706.

A GUI 1000 illustrated in FIG. 10 includes an inference result selection unit 1001, an inference image display unit 1002, a display step number selection unit 1003, a coordinate and enlargement magnification setting unit 1004, a position displacement estimation setting amount input unit 1005, and a position displacement estimation setting amount determination unit 1006. A user input operation performed by each unit implementing the GUI 1000 is performed by using a mouse, a keyboard, a touch panel, or the like.

The inference result selection unit 1001 selects one or more from the training progress which is stored in step S909 of the training processing unit 701 and which includes the probability distribution in training 403, the estimation position displacement amount 703, and the position-displacement-reflected probability distribution in training 407, and displays it on the inference image display unit 1002.

The inference image display unit 1002 displays a result in the number of training steps specified by the display step number selection unit 1003 to be described later by an image or a graph for the training progress selected by the inference result selection unit 1001. Here, an example is described in which one image is displayed, and a plurality of images or graphs may be displayed side by side.

The display step number selection unit 1003 can change the number of training steps of the training progress displayed on the inference image display unit 1002 to switch the image or the graph.

The coordinate and enlargement magnification setting unit 1004 can change a display magnification or a position of the displayed image or graph.

In the position displacement estimation setting amount input unit 1005, each item of the position displacement estimation setting amount 704 input to the position displacement amount estimation unit 702 is displayed, and the user specifies a numerical parameter or a content by a keyboard input or pull-down.

The position displacement estimation setting amount determination unit 1006 performs processing of inputting the content input by the position displacement estimation setting amount input unit 1005 to the position displacement estimation setting amount update unit 706 illustrated in FIG. 7, and updates the content of the position displacement estimation setting amount 704. After the update processing, the training processing of the training processing unit 701 in FIG. 7 is executed again.

According to the present embodiment, the training of the probability distribution estimation model in the initial training stage can be stabilized by estimating the position displacement amount satisfying the restriction condition set in the position displacement estimation setting amount 704 during the estimation by the position displacement amount estimation unit 702.

As an example when the present embodiment is applied, an excessive position displacement amount shifted by one cycle may be estimated in the circuit with a repeating pattern as illustrated in FIG. 1A. In addition, in a line and space circuit in which linear patterns are arranged, a position displacement amount that does not exist in a direction in which the line pattern extends may be estimated. In such a case, the probability distribution of the pixel value of the captured image at a position corresponding to the design data may not be normally trained, whereas by applying the present embodiment, it is possible to prevent an estimation of an excessive or non-existent position displacement amount, and to stably train the probability distribution of pixel value of the captured image.

Embodiment 3

An image inspection equipment and an image processing method using the same according to Embodiment 3 of the invention will be described with reference to FIGS. 11 to 13.

FIG. 11 is a functional block diagram illustrating a configuration of a training processing unit 1101 according to Embodiment 3 of the invention.

The training processing unit 1101 according to the present embodiment corresponds to the training processing unit 701 according to Embodiment 2 (FIG. 7) described above, and is different from the training processing unit 701 in that a position displacement between the probability distribution in training 403 and the captured image for training 302 is estimated by using the position displacement amount estimation model generated by the machine learning in a position displacement amount estimation unit 1102.

A difference is in that a model evaluation unit 1104 evaluates the position displacement amount estimation model described above in addition to the probability distribution estimation model, calculates an update amount of a parameter of the position displacement amount estimation model according to an evaluation value, and updates the parameter of the position displacement amount estimation model according to the update amount.

As illustrated in FIG. 11, the training processing unit 1101 according to the present embodiment includes the probability distribution estimation unit 402, the position displacement amount estimation unit 1102, the position displacement reflection unit 406, the model evaluation unit 1104, the training progress display unit 705, and the position displacement estimation setting amount update unit 706, outputs model data 1108 when predetermined training processing is ended, and stores the model data 1108 in a RAM, an external storage device, or a cloud storage via a network connection. Hereinafter, differences from Embodiment 1 and Embodiment 2 will be described.

The position displacement amount estimation unit 1102 estimates a position displacement amount between the probability distribution in training 403 estimated by the probability distribution estimation unit 402 and the captured image for training 302 by using a position displacement amount estimation model created by machine learning, and outputs an estimation position displacement amount 1103. At this time, a position displacement amount is estimated, which satisfies a restriction condition corresponding to the training step set in the position displacement estimation setting amount 1107 corresponding to the position displacement estimation setting amount 704 in FIG. 7.

The position displacement amount estimation model for estimating the position displacement amount uses, for example, a CNN of an encode-decoder type such as a U-Net or a CNN having another structure, and is not limited to the CNN.

The model evaluation unit 1104 evaluates the probability distribution estimation model of the probability distribution estimation unit 402 by using the captured image for training 302 and the position-displacement-reflected probability distribution in training 407, calculates an update amount of the parameter of the probability distribution estimation model according to an evaluation value, and updates the parameter of the probability distribution estimation model according to the update amount (probability distribution estimation model parameter update amount 1105). The position displacement amount estimation model of the position displacement amount estimation unit 1102 is evaluated, the update amount of the parameter of the position displacement amount estimation model is calculated according to the evaluation value, and the parameter of the position displacement amount estimation model is updated according to the update amount (position displacement amount estimation model parameter update amount 1106). At this time, the update amount of the parameter is calculated such that the pixel value of the captured image for training 302 better follows the position-displacement-reflected probability distribution in training 407.

FIG. 12 is a flowchart illustrating a processing operation of the training processing unit 1101 according to the present embodiment. Differences from Embodiment 2 illustrated in FIG. 9 will be described.

In step S1203, the training processing unit 1101 receives an input of the position displacement estimation setting amount 1107. The position displacement estimation setting amount 1107 corresponds to the position displacement estimation setting amount 704 in FIG. 7, and in addition to the example of the restriction condition illustrated in FIG. 8, additional restrictions can be set to the error function and the loss function for evaluating the position displacement amount estimation model of the position displacement amount estimation unit 1102 in step S1208 to be described later.

In step S1204, the position displacement amount estimation unit 1102 implementing the training processing unit 1101 estimates the position displacement amount between the probability distribution in training 403 and the captured image for training 302 by using the position displacement amount estimation model, and estimates the estimation position displacement amount 1103.

At this time, the position displacement amount satisfying the restriction condition set in the position displacement estimation setting amount 1107 is estimated. For example, when an upper limit value of the norm of the estimation position displacement amount is specified, an activation function in which the norm of the position displacement amount is equal to or less than the specified upper limit value may be applied to the estimation of the position displacement amount estimation model.

In step S1208, the model evaluation unit 1104 implementing the training processing unit 1101 evaluates the error function or the loss function of the position displacement amount estimation model of the position displacement amount estimation unit 1102 by using the input captured image for training 302 and the position-displacement-reflected probability distribution in training 407.

Examples of the error function or the loss function of the position displacement amount estimation model include a negative log-likelihood of the position-displacement-reflected probability distribution in training 407 with respect to the captured image for training 302, an absolute error or a square error between an image sampled from the position-displacement-reflected probability distribution in training 407 and the pixel value of the captured image for training 302. Examples thereof include an additional error function and loss function set in the position displacement estimation setting amount 1107, and for example, examples thereof include a reduction in the norm of the estimation position displacement amount using a function for evaluating a difference from a value when the norm of the estimation position displacement amount exceeds a specified value. In this case, the model evaluation unit 1104 evaluates the position displacement amount estimation model using the estimation position displacement amount 1103.

In step S1209, the model evaluation unit 1104 calculates the update amount of the parameter of the position displacement amount estimation model to reduce the error function or the loss function of the probability distribution estimation model of the position displacement amount estimation unit 1102 based on an evaluation result in step S1208, and updates the parameter according to the update amount. The update is performed by, for example, a stochastic gradient descent method.

In step S1211, the training processing unit 1101 determines whether a training end condition has been reached, the processing proceeds to step S1212 if it is determined that the training end condition has been reached (YES), and the training processing unit 1101 stores the model data 1108 including the parameter of the probability distribution estimation model of the probability distribution estimation unit 402 and the parameter of the position displacement amount estimation model of the position displacement amount estimation unit 1102 and ends the training processing. On the other hand, when it is determined that the training end condition has not been reached (NO), the processing returns to step S1201, and the processing after step S1201 is executed again.

Examples of the training end condition include whether the processing from step S1201 to step S1210 is repeated a predetermined number of times or more, whether it is determined that a value of the error function of the probability distribution estimation model obtained in step S1206 and a value of the error function of the position displacement amount estimation model obtained in step S1208 are not reduced even when the processing from step S1201 to step S1210 is repeated a predetermined number of times and the training of the probability distribution estimation model of the probability distribution estimation unit 402 and the position displacement amount estimation model of the position displacement amount estimation unit 1102 has converged, or the like.

FIG. 13 is a flowchart illustrating a processing operation of an inspection processing unit 307B according to the present embodiment. Differences from Embodiment 1 (FIG. 6) will be described.

As illustrated in FIG. 13, in step S1301, the captured image for inspection 306, the inspection design data 305, and the model data 1108 including the parameter of the probability distribution estimation model trained by the training processing unit 1101 and the parameter of the position displacement amount estimation model are input to the inspection processing unit 307B.

In step S1303, the inspection processing unit 307B estimates the position displacement between the probability distribution estimated in step S1302 and the captured image for inspection 306 based on the position displacement amount estimation model included in the input model data 1108.

In this way, when the machine learning is used for the position displacement amount estimation model, there is an advantage in that it is possible to reduce a memory usage amount and a calculation time of a computer that executes the training processing and the inspection processing by changing the configuration of the position displacement amount estimation model even with a trade-off with the estimation accuracy. As a method of reducing the calculation time by changing the configuration of the position displacement amount estimation model, for example, it is possible to reduce the number of channels of a convolutional layer used in a CNN or reduce the number of layers.

As described above, according to the present embodiment, in addition to the effects of Embodiment 1 and Embodiment 2, by changing the configuration of the position displacement amount estimation model, it is possible to reduce a memory usage amount and a calculation time of a computer that executes the training.

The invention is not limited to the embodiments described above and includes various modifications. For example, the embodiments described above have been described in detail to facilitate understanding of the invention, and the invention is not necessarily limited to those including all the configurations described above. A part of the configuration of one embodiment can be replaced with the configuration of another embodiment, and the configuration of another embodiment can be added to the configuration of one embodiment. A part of a configuration according to each embodiment may be added to, deleted from, or replaced with another configuration.

REFERENCE SIGNS LIST

101: design data
102: captured image
301: training design data
302: captured image for training
303, 401, 701, 1101: training processing unit
304, 410, 1108: model data
305: inspection design data
306: captured image for inspection
307, 307A, 307B: inspection processing unit
308: inspection result
402: probability distribution estimation unit
403: probability distribution in training
404, 702, 1102: position displacement amount estimation unit
405, 703, 1103: estimation position displacement amount
406: position displacement reflection unit
407: position-displacement-reflected probability distribution in training
408, 1104: model evaluation unit
409: model parameter update amount
704, 1107: position displacement estimation setting amount
705: training progress display unit
706: position displacement estimation setting amount update unit
1000: GUI
1001: inference result selection unit
1002: inference image display unit
1003: display step number selection unit
1004: coordinate and enlargement magnification setting unit
1005: position displacement estimation setting amount input unit
1006: position displacement estimation setting amount determination unit
1105: probability distribution estimation model parameter update amount
1106: position displacement amount estimation model parameter update amount

The invention claimed is:

1. An image inspection equipment for inspecting a captured image of a sample by using design data of the sample and the captured image, the image inspection equipment comprising:

a training processing unit configured to train a probability distribution estimation model for estimating a probability distribution of a pixel value of the captured image based on the design data; and an inspection processing unit configured to inspect a captured image for inspection by using the probability distribution estimation model created by the training processing unit, inspection design data, and the captured image for inspection, wherein the training processing unit includes a probability distribution estimation unit configured to estimate a probability distribution of a pixel value of a captured image for training of the sample based on training design data of the sample, a position displacement amount estimation unit configured to estimate a position displacement amount between a probability distribution in training estimated by the probability distribution estimation unit and the captured image for training, a position displacement reflection unit configured to reflect an estimation position displacement amount estimated by the position displacement amount estimation unit in the probability distribution in training, and a model evaluation unit configured to evaluate a probability distribution estimation model of the probability distribution estimation unit by using the captured image for training and a position-displacement-reflected probability distribution in training calculated by the position displacement reflection unit and update a parameter of the probability distribution estimation model according to an evaluation value.

2. The image inspection equipment according to claim 1, wherein a position displacement estimation setting amount for stabilizing training of the probability distribution of the pixel value of the captured image is received based on a restriction of a position displacement amount corresponding to the number of training steps including a maximum value of the position displacement amount estimated by the position displacement amount estimation unit.

3. The image inspection equipment according to claim 2, further comprising:

a training progress display unit configured to record a result obtained by visualizing the probability distribution in training, the position-displacement-reflected probability distribution in training, and the estimation position displacement amount for each training step, and display the result on a GUI; and a position displacement estimation setting amount update unit configured to allow a user to update the position displacement estimation setting amount based on a display result of the training progress display unit.

4. The image inspection equipment according to claim 1, wherein the position displacement amount estimation unit estimates the position displacement amount between the probability distribution in training and the captured image for training by using a position displacement amount estimation model created by machine learning.

5. The image inspection equipment according to claim 4, wherein the model evaluation unit evaluates the probability distribution estimation model and the position displacement amount estimation model, and updates the parameter of the probability distribution estimation model and a parameter of the position displacement amount estimation model according to an evaluation value.

6. An image processing method for training a model for estimating a probability distribution of a pixel value of a captured image of a sample by using design data of the sample and the captured image, the image processing method comprising:

(a) a step of estimating a probability distribution in training of a pixel value of a captured image for training of the sample based on training design data of the sample;

(b) a step of estimating a position displacement amount between the probability distribution in training estimated in the (a) step and the captured image for training;

(c) a step of reflecting the position displacement amount estimated in the (b) step in the probability distribution in training; and (d) a step of evaluating a probability distribution estimation model estimated in the (a) step by using the captured image for training and a position-displacement-reflected probability distribution in training calculated in the (c) step, and updating a parameter of the probability distribution estimation model according to an evaluation value.

7. The image processing method according to claim 6, wherein in the (b) step, a position displacement estimation setting amount for stabilizing training of the probability distribution of the pixel value of the captured image is received based on a restriction of a position displacement amount corresponding to the number of training steps including a maximum value of the estimated position displacement amount.

8. The image processing method according to claim 7, wherein a result obtained by visualizing the probability distribution in training, the position-displacement-reflected probability distribution in training, and the position displacement amount is recorded for each training step and is displayed on a GUI, and a user is capable of updating the position displacement estimation setting amount based on a display result on the GUI.

9. The image processing method according to claim 6, wherein in the (b) step, the position displacement amount between the probability distribution in training and the captured image for training is estimated by using a position displacement amount estimation model created by machine learning.

10. The image processing method according to claim 9, wherein in the (d) step, the probability distribution estimation e position displacement amount estimation model are evaluated, and the parameter of the probability distribution estimation model and a parameter of the position displacement amount estimation model are updated according to an evaluation value.

* * * * *